United States Patent [19]

Ayusawa et al.

[11] 4,091,123
[45] May 23, 1978

[54] METHOD FOR THE MANUFACTURE OF A STEEL SHEET HAVING EXCELLENT LUBRICATING PROPERTY

[75] Inventors: Saburo Ayusawa; Takeo Nagashima; Masaya Tsutsumi, all of Kimitsu, Japan

[73] Assignee: Nippon Steel Corporation, Tokyo, Japan

[21] Appl. No.: 696,037

[22] Filed: Jun. 14, 1976

[51] Int. Cl.$^2$ .............................................. B44D 1/50
[52] U.S. Cl. ........................................ 427/44; 72/42; 204/159.22; 204/159.23; 252/56 S; 427/388 A
[58] Field of Search ................ 427/44, 388 A; 72/42; 252/56 S; 204/159.22, 159.23

[56] References Cited

U.S. PATENT DOCUMENTS

| | | | |
|---|---|---|---|
| 3,090,698 | 5/1963 | Wilson | 427/44 X |
| 3,247,012 | 4/1966 | Burlant | 427/44 |
| 3,535,148 | 10/1970 | Rauuc | 427/44 |
| 3,713,935 | 1/1973 | Grecchi | 156/249 X |
| 3,728,147 | 4/1973 | Jenkins et al. | 427/44 X |

FOREIGN PATENT DOCUMENTS

| | | | |
|---|---|---|---|
| 2,046,653 | 4/1971 | Germany | 427/44 |
| 2,058,294 | 6/1971 | Germany | 427/44 |
| 1,280,063 | 7/1972 | United Kingdom | 427/44 |

OTHER PUBLICATIONS

Inhibition of Mild Steel Corrosion by Organic Polymers, Hartman et al., Materials Protection & Performance, vol. 11, No. 2, 1972, pp. 28–34.

*Primary Examiner*—Michael R. Lusignan
*Attorney, Agent, or Firm*—Watson, Leavenworth, Kelton & Taggart

[57] ABSTRACT

A steel sheet having a two-layer film which exhibits excellent lubricating properties under press working can be manufactured by one step coating. In this case the coating composition after being applied to the sheet is irradiated with ionizing radiant energy, i.e., radioactive ray or electromagnetic wave, in an atmosphere containing an oxidizing substance.

The outermost layer obtained is an uncured or unhardened semi-fluid layer but the layer contacting the surface of the steel sheet is a cured or hardened resin layer. If a lubricant is incorporated in the coating composition, or if the main component of the coating composition has one double bond per molecule, the result is more advantageous.

6 Claims, 7 Drawing Figures

METHOD FOR THE MANUFACTURE OF A STEEL SHEET HAVING EXCELLENT LUBRICATING PROPERTY

DETAILED DESCRIPTION OF THE INVENTION:

This invention relates to a method for the manufacture of a steel sheet having an excellent lubricating property. More particularly, it relates to such a method in which a partially solid lubrication film having excellent formability in press work and also a good anti-rust property before and after the press work is coated upon a hot rolled and pickled steel sheet, cold rolled steel sheet or a surface-treated steel sheet, etc., which are hereinafter referred to as a steel sheet.

It is therefore an object of this invention to provide a steel sheet capable of being subjected to press work under severe conditions which could not be applied to those press forming oils as used in conventional press work.

It is another object of this invention to provide an anti-rust, lubricant-applied steel sheet which will make it possible to simplify the steps of press work and also improve the environment of the workplace.

According to this invention, there is provided a method for the manufacture of a steel sheet having an excellent lubricating property which comprises coating a coating composition on a surface of a steel sheet, said coating composition consisting mainly of a monomer and/or a polymer which is prevented from polymerization and/or crosslinking reaction in an atmosphere containing an oxidizing substance, said coating composition being cured by energy of a radioactive ray having an ionizing property or an electromagnetic wave, irradiating the energy in the atmosphere containing the oxidizing substance, and thereby producing a two-layer film on the surface of said steel sheet, said two-layer film being composed of a cured film on the surface side of said steel sheet and an uncured, semi-fluid film on the outermost side of the film.

In conventional press work using a press forming oil or a solid lubricant such as wax or metallic soap, direct contact of the work piece or steel sheet and the processing tools will inevitably cause linear scratching or galling, hereinafter referred to as galling, if the press forming conditions are severe such as in press working of high strength steel sheet, deep drawing, etc. wherein the surface pressure of a die is very high. In this case, it often happens that the commercial value of a product will be lessened and even fracture of the sheet by press forming can occur.

In an attempt to solve the above mentioned problems, a lubrication film obtained by giving a lubrication effect to an organic high molecular compound, hereinafter referred to as resin, has recently been proposed, making use of the excellent strength and adhesiveness to the steel sheet that the resin has. It has thus been proposed to coat on the resin a resin-softener capable of forming a semi-fluid resinous layer having good lubrication property at the time of press forming work, or mix in the resin a fat, fatty acid, alkyl ester of fatty acid, metallic soap, etc. having good lubrication property, and to apply the same to the steel sheet.

The above mentioned lubricant-treated steel sheet of the resin film type has excellent press formability, but a step of drying or evaporating water, etc. after coating is required, since the resin must be applied after it is diluted with such solvent as water, etc. In order to effect the drying, it is necessary to heat the steel sheet which heating step could otherwise be saved, and as a result a large drying apparatus is required with a high treatment cost. Moreover, because of the low workability in the drying step, it is almost impossible to keep a reasonable work level in the conventional apparatus for high speed production of the steel sheet.

This invention has an advantage that the lubrication treatment can be done with low cost and in the conventional apparatus for high speed production of the steel sheet whereby the workability will not be lowered and yet a solid lubrication-treated steel sheet having excellent press formability can be manufactured.

This invention is further described with respect to the drawings.

FIGS. 1 and 2 (A) and (B) are schematic sectional views illustrating examples of a steel sheet treated by a two-layer solid lubricating film obtained by the method of this invention.

Figure 1:
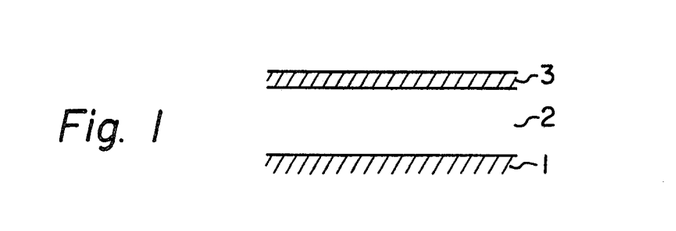

In the practice of this invention, a lubrication film is formed by coating on a steel sheet a monomer and/or polymer of a radical polymerization or radical addition polymerization type and irradiating a radioactive ray of ionization type such as $\beta$-ray, $\gamma$-ray, X-ray, electron ray, etc., or an electromagnetic wave such as ultraviolet ray, etc. under oxidizing atmosphere so as to effect polymerization or crosslinking reaction. In this case, an oxidizing substance in the atmosphere has the effect of stopping the polymerization or the crosslinking reaction, and accordingly, the polymerization and/or crosslinking reaction does not occur in the monomer and/or polymer applied in contact with the atmosphere so that they will remain as applied. It means that, in FIG. 1, a film 2 having excellent adhesiveness and strength exists in direct contact with a steel sheet 1 and on the cured film 2 a somewhat fluidized or soft film 3 having excellent lubrication effect exists. This constitutes an ideal lubrication film structure for press formability.

As set forth above, the monomer and/or polymer used in this invention should be of a character in which the polymerization or crosslinking reaction is stopped in an atmosphere containing an oxidizing substance. Its mechanism is such that if an oxygen exists in the course of polymerization reaction caused by iradiation of an ionizing radioactive ray or an electromagnetic ray, a radical which is a promoting power for the polymerization reaction will react with the oxygen to produce a relatively stable peroxide, whereby the polymerization reaction will not proceed any longer.

It has been reported that the rate of addition reaction of the oxygen to the radical is one or two million times the rate of addition reaction of the radical to the double bond. Consequently, when it is used as an ordinary paint, it has been proposed to irradiate an ionizing radioactive ray or an electromagnetic wave in a non-oxidizing atmosphere, or to add, before coating, a material such as paraffin or wax which has poor compatibility with the resin so as to allow the material to exude at the time of polymerization and intercept the oxygen in the air. Furthermore, in case of photo-polymerization or photo-crosslinking, it has been proposed to dissolve the monomer and/or the polymer in a great amount of solvent to intercept the oxygen or to purge it by means of an inert gas. However, as for the film according to this invention which shows excellent press formability to meet the object of this invention, it is most convenient to leave an unreacted semi-fluid layer on the outermost surface by stopping the curing of only the outermost with the aid of the above mentioned activity of the oxidizing substance in the atmosphere. The oxidizing substance herein referred to is oxygen, ozone, etc. but it is most preferable to use an oxygen-containing atmosphere, that is, air in view of easy work or cost. The concentration of the oxidizing agent may be 0.5% or more in case of oxygen, for example. The monomer and/or the polymer used in the method of this invention are those which are subjected to polymerization or crosslinking reaction by means of the radical polymerization reaction. In view of the mechanism of the radical polymerization reaction, they should have at least one carboncarbon double bond or radical-producing group per one molecule and in the course of polymerization or crosslinking, the portion of that carbon-carbon double bond or the radical-producing group should become a radical whereby the addition reaction will occur.

Typical examples of the reaction group is shown in Table 1 below.

Table 1

| Kind of reaction groups | Examples |
|---|---|
| Olefin and its derivatives | Vinyl ester, Vinyl halide, Acrylnitrile, Vinylidene chloride, Vinyl ether |
| Diene compound | Butadiene, Isoprene, Chloroprene and their alkyl, aryl, halogen derivatives |
| Cyclic compound having high degree of unsaturation | Indene, Cumarone |
| Photo active group | Those containing diazo group, azide group, cinnamoyl group, acryloly group in the molecule |

The monomer and/or the polymer having the reaction group shown in Table 1 may be used together with a suitable polymerization initiator, polymerization accelerator depending upon the kind used and the way of curing.

A method of photo-polymerization or photo-crosslinking using an ultraviolet ray makes it possible to effect polymerization and crosslinking reaction very easily and in a short time on the steel sheet. Photo-polymerization may usually be conducted by the addition of a suitable polymerization initiator to a monomer or polymer having a carbon-carbon double bond, examples of which are indicated in Table 2.

Table 2

| Photo-sensitive monomer or polymer | Photo reaction initiator |
|---|---|
| Styrene | Benzyl Benzophenone 2-methylanthraquinone |
| Acrylate | Benzoin ethyl ether Azo-bis-isobutyronitrile 2-methylanthraquinone |
| Ethylenic unsaturated compound | Dibutyl sulfide Benzyl disulfide Decylphenylsulfide |
| Acrylamide | Benzoyl peroxide Hydrogen peroxide |
| Vinyl acetate | Azo-bis-isobutyronitrile |

Photo-crosslinking examples include those combining with the polymer a cinnamoyl group or diazo group which is photo-active, as exemplified by polyvinyl cinnamate, polyazidediphenylamine sulphonic acid, polyazide vinyl benzoate, etc. In some cases, a suitable polymerization initiator is added thereto before use, or bisacrylamide having acryloyl groups at both ends may be used as a photo-crosslinking agent of polyamide.

In Table 3, examples of combination of a polymer with an initiator for the case of photo-crosslinking are shown.

Table 3

| Photo-sensitive polymer | Initiator |
|---|---|
| Polyamide | Benzophenone Benzoinethylether Benzoyl peroxide |
| Polyester | Benzyl |
| Polyacrylate | 2-methyl anthraquinone |

Among the substances shown in Table 3, the monomers and/or polymers which are particularly suitable as the solid lubricating film are of the acrylic or methacrylic system. Examples are shown in Table 3'.

Table 3'

No.

1  $CH_2=C(CH_3)COO(CH_2)_2OCO-\langle\bigcirc\rangle-COO(CH_2)_2OCOC(CH_3)=CH_2$ 2  $CH_2=C(CH_3)COO(CH_2)_2O(CH_2)_2OCO-\langle\bigcirc\rangle-COO(CH_2)_2O(CH_2)_2OCOC(CH_3)=CH_2$ 3  $CH_2=C(CH_3)COO(CH_2)_3OCO-\langle\bigcirc\rangle-COO(CH_2)_3OCOC(CH_3)=CH_2$ 4  $CH_2=CHCOO(CH_2)_2OCO-\langle\bigcirc\rangle-COO(CH_2)_2OCOCH=CH_2$ 5  $CH_2=C(CH_3)COOCH_2$
   $CH_2=C(CH_3)COO(CH_2)_4$ $>CHOCO-\langle\bigcirc\rangle-COOCH<$ $CH_2OCOC(CH_3)=CH_2$
   $(CH_2)_4OCOC(CH_3)=CH_2$ Table 3'-continued

| No. | |
|---|---|
| 6 | $CH_2=C(CH_3)COO(CH_2)_2OCO(CH_2)_4COO(CH_2)_2OCOC(CH_3)=CH_2$ |
| 7 | $CH_2=C(CH_3)COO(CH_2)_2OCO(CH_2)_3COO(CH_2)_2OCOC(CH_3)=CH_2$ |
| 8 | $CH_2=C(CH_3)COO(CH_2)_2OCOCH=CHCOO(CH_2)_2OCOC(CH_3)=CH_2$ |
| 9 | $CH_2=CHCOO(CH_2)_2OCO(CH_2)_4COO(CH_2)_2OCOCH=CH_2$ |
| 10 | $CH_2=CHCOO(CH_2)_2O(CH_2)_2OCO(CH_2)_4COO(CH_2)_2O(CH_2)_2OCOCH=CH_2$ |

Figure 2:
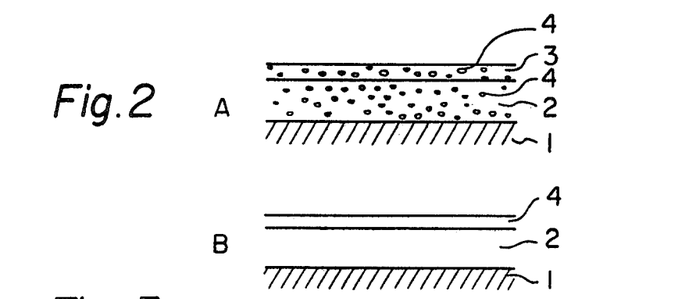

In one aspect of the invention, a lubricant which is incompatible with the coating composition according to this invention can be mixed in said composition. This composition is thereafter coated on a steel sheet, upon which an ionizing radioactive ray or an electromagnetic wave is irradiated to produce a two layer lubricating film. This film is schematically shown in FIG. 2 (A), wherein the lubricant 4 is dispersed both in the cured film 2 and the uncured layer 3. This type of film yields better press formability than those which contain no lubricant.

If the lubricant used is in liquid status at room temperature, the amount of the lubricant in the uncured layer will change according to the time from the coating to the irradiation of the indicated ray or wave, hereinafter referred to as the setting time. If the setting time is more than 1.0 second, there appears a two-layer structure as shown in FIG. 2 (B) which consists of the layer of the lubricant 4 and the layer of the cured film 2. In this case, when the ionizing radioactive ray or electromagnetic wave is irradiated to the coating composition in the presence of the oxidizing atmosphere, the uncured layer will not positively produced since the outermost layer produced can intercept the atmosphere. Even in this case, the product steel sheet has a press formability which is better than that of the case in which the lubricant is not used.

The lubricant herein used should preferably be that which is incompatible with the coating composition, examples of which are paraffin, fatty acid, ester of fatty acid, metallic soap of fatty acid, graphite, molybdenum disulfide, tungsten disulfide, talc, boron nitride, etc. It is preferable that the concentration of the lubricant added is not more than 50% by weight of the coating composition.

Figure 3:
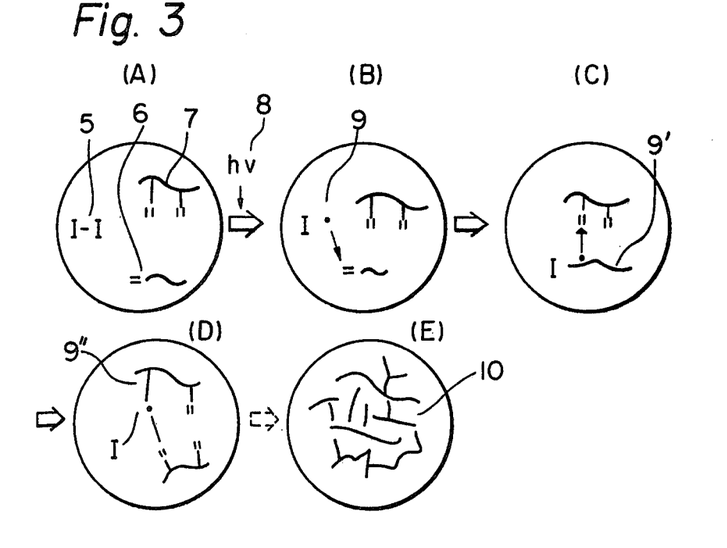
FIG. 3 is a schematic pattern showing a mechanism of polymerization and crosslinking structure.

Usually, the monomer and/or polymer which will be cured by the irradiation of the ionizing radioactive ray or electromagnetic wave are those having two or more carbon-carbon double bonds in one molecule which have polymerization reactivity. Accordingly, when the above indicated ray or wave is irradiated, a polymerization initiator 5 becomes a radiacal 9 by the irradiation of an ultra-violet ray 8 as shown in FIG. 3 (A) and (B), which is then added to the double bond of a monomer 6 to produce a monomer radical 9' as shown in FIG. 3 (C). The monomer radical 9' is added to a polymer 7, producing polymer radical 9" as shown in FIG. 3 (C) and (D). The addition reactions of the monomer and polymer are repeated in this way, which finally results in a three-dimensional net-like structure 10 as shown in FIG. 3 (E). The film as produced like this will be peeled off in powdery conditions for lack of plasticity in case that the steel sheet to which this film has been applied is subjected to a plastical deformation accompanied by about 30% elongation at maximum such as caused by press work.

This phenomenon is particularly emphasized when the film will contact the die face side because it is subjected to ironing or severe deformation according to the curvature of the die. Moreover, in the press work, the heat generated by the plastic deformation of the steel sheet will cause a crosslinking reaction in the resin film, which results in the harder cured film or even the pulverization of the film. Accordingly, when it is desired to uniformly place the lubricating film on the steel sheet even after the press work, it is considered to be necessary that the cured film has no three-dimensional net-like structure or it does not cause any crosslinking reaction due to the heat. In order to meet this demand, a resin having a linear structure is suitable as the film. It has thus been found that in case of irradiating the indicated ray or wave it is preferable to have one polymerizable double bond per molecule of the monomer and/or polymer in the coating composition.

Among such monomers and/or polymers, those which are preferable as the solid lubricating film are of the acrylic and methacrylic system, in which examples of those having one double bond per molecule are shown in Table 3".

Table 3"

| No. | Constitutional formula | |
|---|---|---|
| 1 | $CH_2=CHCOO(CH_2)_nOH$, | where n = 1 to 6 |
| 2 | $CH_2=C(CH_3)COO(CH_2)_nOH$, | where n = 1 to 6 |
| 3 | $CH_2=CHCOO(CH_2)_nCOO(CH_2)_nCOOH$, | where n = 1 to 6 |
| 4 | $CH_2=C(CH_3)COO(CH_2)_nCOO(CH_2)_nCOOH$, | where n = 1 to 6 |
| 5 | $CH_2=CHCOO(CH_2)_nCOO-\langle \bigcirc \rangle-COOH$, | where n = 1 to 6 |
| 6 | $CH_2=C(CH_3)COO(CH_2)_nCOO-\langle \bigcirc \rangle-COOH$, | where n = 1 to 6 |

Table 3"-continued

| No. | Constitutional formula | |
|---|---|---|
| 7 |  | |
| 8 | $CH_3(CH_2)_nOCH_2\underset{OH}{CH}CH_2OCOCH=CH_2$, | where n = 1 to 6 |

When such coating composition is coated on a steel sheet and irradiated by the indicated ray or wave in an oxidizing atmosphere, the steel sheet thus treated has an excellent press formability with a two-layer structure, i.e. the uncured layer and the cured layer, and shows no fear that the film may be peeled off at the time of press forming. Similarly, when the coating composition with which a lubricant has been mixed is applied to a steel sheet and irradiated by the indicated ray or wave in the presence of an oxidizing atmosphere, the steel sheet thus treated has an excellent press formability with two layers, that is, the cured layer and the uncured layer containing the lubricant and shows no fear that the film may be peeled off at the time of press forming. Furthermore, it has been found to be most desirable that the monomer and/or polymer in an amount of at least 80% by weight thereof have one polymerizable double bond per molecule.

The essential element other than the monomer and/or polymer having the polymerizable double bond is the polymerization initiators shown in Table 2 and Table 3.

The concentration of addition thereof may be several % by weight based upon the monomer and/or polymer. As for other additives, there may be an anti-rust agent, an anti-blocking agent such as paraffin, fatty acid, alkyl ester of fatty acid, metallic soap of fatty acid, which are solid at ordinary temperature, a solvent which facilitates the coating operation, etc. The concentration of these additives should preferably be 20% by weight in total based upon the coating composition.

Usually, the steel sheet used for press work will often be degreased by a degreasing agent of a weak alkali type after the press work, and therafter subjected to chemical conversion and coating operation. In such a case, it is preferable that a water-soluble group, that is, hydroxyl group, fatty acid group, fatty acid base group, etc. has been incorporated into the resin film according to this invention.

An example of the method of coating and curing is shown below.

Any dirt or oil values attached to the steel sheet at the time of coating should be removed as far as possible since they give rise to lowering of the adherence power of the resin to the steel sheet. The method of coating can be roll-coating, dipping, spraying, curtain-flowing, etc.

Figure 4:
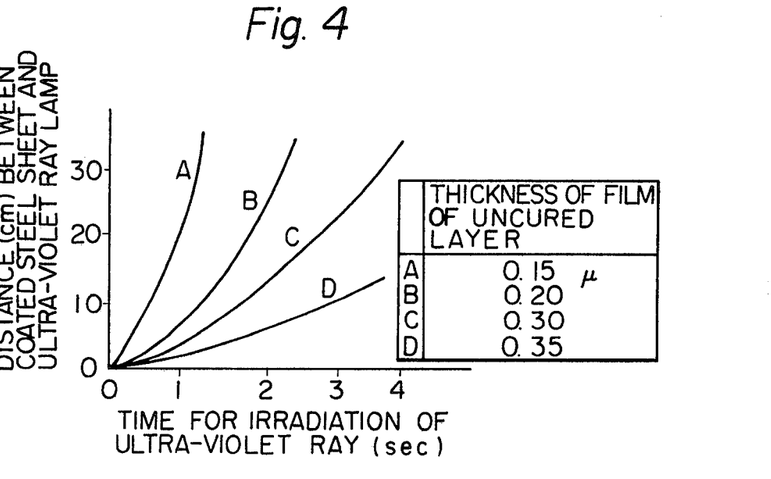
FIG. 4 is a graph showing a relation between the condition for irradiating an ultra-violet ray and the thickness of film of the uncured layer.

The solid lubricating film thus produced consists of two layers, upper of which is in uncured, fluid condition, while lower of which is a cured resin layer. The amount and property of the upper uncured component are affected by the kind and composition of the resin used, the kind and strength of such curing energy as ultra-violet ray, etc., the kind of atmosphere, the concentration of the solvent used, etc. In FIG. 4 is shown a relation of the thickness of the film of uncured semi-fluid layer with the strength and the irradiation time of the ultra-violet ray in case that a non-solvent acrylic monomer and polymer is coated on a steel sheet and then it is allowed to become cured in the air by the use of the ultra-violet ray. In this case the strength of the ultra-violet ray is shown as to become larger as the distance between the ultraviolet lamp and the coated steel sheet. As is clear from FIG. 4, in order to obtain a definite uncured layer, it is necessary to shorten the irradiation time when the strength of the ultra-violet ray is large, and vice versa, which means that the radiation strength and the radiation time is in an inversely proportional relation.

Accordingly, it is required that the strength of radiation energy such as ultra-violet ray, etc. and the irradiation time thereof is properly selected for the purpose of obtaining a suitable thickness of film of the uncured layer.

The uncured layer herein used is a film which is in fluid state at the outermost surface in the presence of an oxidizin substance. The thickness of uncured layer can be calculated by coated weight on the steel sheet. The uncured amount is measured by first dipping the steel sheet treated according to this invention into a solution of carbon tetrachloride at room temperature for 5 minutes, wiping the surface well by a sheet of gauze, drying the solvent and calculating the change of said steel sheet as the uncured amount.

The amount of the cured component attached is the amount calculated by subtracting the uncured attached amount from the total attached amount. The suitable range of hardness of the cured resin should preferably be 2B to 4H according to the pencil hardness. If the hardness is 3B or below, the anti-galling property becomes poor, while if it is 5H or above, troubles come out with respect to the press drawing property.

The pencil hardness is tested by a pencil hardness testing machine whereby the testing pencils according to JIS S6006 each having the standard hardness of 9H, 8H, 7H, 6H, 5H, 3H, 2H, H, F, HB, B, 2B, 3B, 4B, 5B, and 6B are used. In the practice of the test, the pencil having its tip end sharpened is set in the machine at an angle of 45° and the stand on which a test piece has been mounted is moved by handle so that the sharpened tip of the pencil which may scratch the surface of the test piece. This test is conducted one by one from the hard testing pencil. The pencil hardness of the test piece is determined according to the hardness of the pencil used at the time when the scratch does not come to appear on the surface of the test piece.

The thickness of the film of the uncured layer and of the cured layer is further described below.

Figure 5:
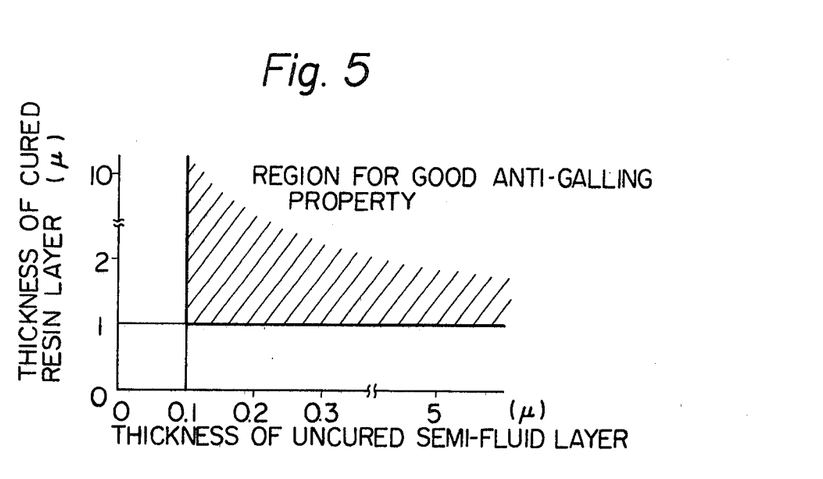
FIG. 5 is a graph showing a region for suitable thickness of the film for uncured and cured layer.

In FIG. 5, a relation between the resin film thickness of cured layer and the thickness of uncured layer attached is shown. When the cured resin layer thickness becomes 1.0$\mu$ or less and the uncured layer thickness becomes 0.1$\mu$ or less, fracture and galling will often occur at the press forming work of the coated steel sheet. As for the upper limit of the cured resin layer thickness, if it is too much, the removal of the film to be effected usually after the press work becomes difficult. Therefore the range should preferably be 1 to 10μ. As for the upper limit of the uncured layer thickness, if it is too much, it will cause poor workability due to over-viscosity of the surface or slip in the blanking line. The suitable range will thus be 0.1 to 5μ, preferably 0.3 to 1μ.

As set forth hereinabove, the solid lubricated steel sheet according to this invention will have an uncured resin monomer and/or polymer on the outermost surface when it is exposed to oxygen in the air for curing, so that an excellent press formability may be provided.

Other advantages of this invention over the prior art are described hereinbelow.

In case of the conventional lubricated steel sheet of the resin film type, the polymer is first dissolved or dispersed in water, etc., followed by coating, and then the water is evaporated to form the film, which thus necessitates the drying of water. As a result, equipment for preheating the steel sheet or drying the water value are required and also it must take about 10 seconds to evaporate the water. Thus it can not be used in a high speed continuous steel sheet treating apparatus. According to this invention, the irradiation time of the curing energy or the curing time can be not more than 1 second. Moreover, the coating composition applied is of non-solvent type and does not require any drying step. Therefor, coating can be done at any place so long as there is a coating apparatus and a space for curing treatment of the order of one second.

On the surface of the resulting steel sheet there is a cured resin film which has good adhesiveness, and on the surface of the cured resin film there is an uncured, semi-fluid layer having good lubricating property. This shows a remarkably excellent press formability.

Furthermore, a lubricating film of two-layer type can be made with a simple coating composition, which makes the operation very easy, as contrasted to the conventional method of making the two-layer film which has required a cumbersome, two-step coating operation.

The examples of the method of this invention are as follows:

Table 4

| Group | Coating composition | Weight ratio (%) | Amount coated g/m² |
|---|---|---|---|
| A | $CH_2=C(CH_3)COOCH_2$<br>$>CHCOO-\bigcirc-COOCH<$<br>$CH_2=C(CH_3)COO(CH_2)_4$     $(CH_2)_4OCOC(CH_3)=CH_2$<br>                                        $CH_2OCOC(CH_3)=CH_2$<br>$CH_2=C(CH_3)COO(CH_2)_2OCO(CH_2)_8COO(CH_2)_2OCOC(CH_3)=CH_2$<br>Benzoin | 49<br><br><br><br>49<br>2 | 5.0 |
| B | $CH_2=CHCOO(CH_2)_2OCO(CH_2)_4COO(CH_2)_2OCOCH=CH_2$<br>Styrene<br>Methylethylketone<br>Benzilsulphide | 50<br>25<br>23.5<br>1 | 4.0 |
| C | Polymethacrylic acid (double bond = 1)<br>Alkylester of polymethacrylic acid (double bond = 4)<br>Paraffin<br>Triethanolamine<br>Benzoin | 54<br>40<br>1<br>5<br>1 | 4.0 |
| D | $CH_2=C(CH_3)COO(CH_2)_2OCO-\bigcirc-COO(CH_2)_2OCOCCH_3=CH_2$<br>$CH_2=CHCOO(CH_2)_2COOH$<br>Monoethanolamine<br>Paraffin (melting point 42° C)<br>Fluid paraffin<br>Zinc stearate<br>Benzoin | 50<br><br>31<br>5<br>10<br>1<br>1<br>2 | 5.5 |
| E | Methyl polymethacrylate (double bond = 1)<br>Polyacryl nitrile (double bond = 1)<br>Glycidyl polyacrylate (double bond = 3)<br>Tert. butyl anthraquinone<br>Calcium stearate<br>Triethanolamine | 30<br>20<br>30<br>2<br>13<br>5 | 5.5 |
| F | $CH_2=CHCOOCH_2COO-\bigcirc_H-COOH$<br>$CH_2=CHCOOCH_2COOH$<br>Benzophenone | 85<br><br>13<br>2 | 3.5 |
| G | $CH_2=C(CH_3)COOCH_2COO-\bigcirc_H-COOH$<br>$CH_2=C(CH_3)COOCH_2-OH$<br>Dibutylsulphide<br>Triethanolamine | 50<br><br>44<br>1<br>5 | 3.5 |
| H | $CH_2=C(CH_3)COOCH_2COO-\bigcirc_H-COOH$<br>$CH_2=C(CH_3)COOCH_2-OH$<br>Dibutylsulphide<br>Triethanolamine<br>Zinc stearate<br>Paraffin (melting point 42° C) | 70<br><br>11<br>2<br>5<br>1<br>10 | 4.0 |

Table 4-continued

| Group | Coating composition | Weight ratio (%) | Amount coated g/m² |
|---|---|---|---|
| I | Fluid paraffin | 1 | |
| | $CH_2=CHCOO(CH_2)_2COO-\phenyl-COOH$ | 63 | |
| | $CH_2=CHCOO(CH_2)_2COOH$ | 15 | |
| | Methylanthraquinone | 1 | |
| | Sodium stearate | 1 | 4.5 |
| | Paraffin (melting point 60° C) | 10 | |
| | Fluid paraffin | 5 | |
| | Triethanolamine | 5 | |
| J | $+CH-CH_2\frac{}{n}-C=CH_2$ with phenyl groups (n = 5 to 10) | 59 | |
| | $CH_2=CHCOO(CH_2)_2COOH$ | 20 | 4.0 |
| | Benzoin | 1 | |
| | Pentaerythritol - Fatty acid ester (Fatty acid; Made of Coconut oil) | 15 | |
| | Triethanolamine | 5 | |
| K | Pentaerythritol - Fatty acid ester (Fatty acid; Made of Coconut oil) | 80 | 3.0 |
| | Barium naphtenate | 20 | |
| L | Commercially available press forming oil | | 5.0 |

Figure 6:
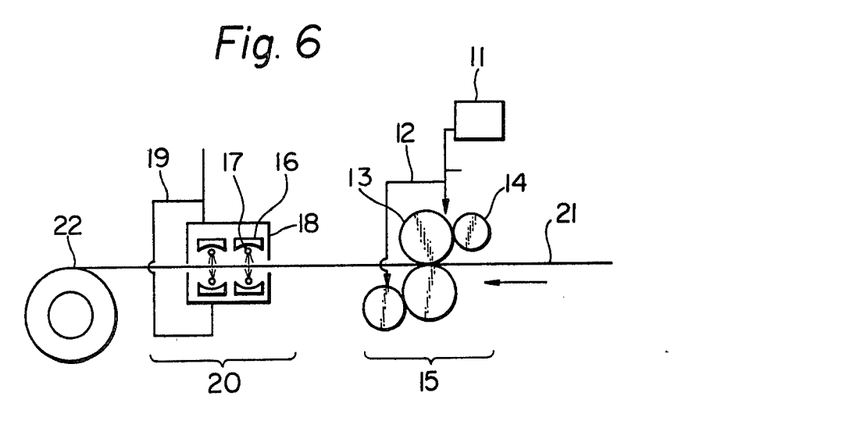
FIG. 6 is an elevational and plan views schematically indicating an example for treating a steel strip according to this invention.

The coating compositions shown as Group A to J according to this invention were coated on a cold rolled steel strip 21 by means of the roll coater unit 15 which was heated by circulation of hot water (FIG. 6).

In FIG. 6, the numeral 11 is a make-up tank for the coating composition; 12 is a pipe for feeding the composition; 16 is a housing for the ultra-violet ray lamp; 18 is a cover or hood; 19 is a duct for cooling the lamp; and 22 is a coiler. Thus the temperature of the coater roll 13 was 45° C and that of the doctor roll 14 was 60° C. In the ultra-violet ray irradiation unit 20, the ultra-violet ray lamps 17 used were positioned in perpendicular to the direction of treatment of the steel strip, two above and two below the steel strip, respectively. The strength of the lamps was 80 W/cm, the effective irradiating width was 1400 mm and the output was 11.2 KW. The velocity of the steel strip passing was 60 m/min. The steel strip thus treated was indicated in Table 5.

Table 5

| Material | ASTM A61968 | |
|---|---|---|
| Thickness | 0.8 | mm |
| Width | 750 | mm |
| Amount treated | 20 | Ton |

The properties of the solid lubricating film of the treated steel strip or sheet which was cured under the above conditions are shown in comparison with the reference compositions K and L in Table 6.

Table 6

| Treated steel sheet | Coating composition | Thickness of uncured lubricant layer (μ) | Thickness of cured layer (μ) | Pencil hardness of hardened layer |
|---|---|---|---|---|
| a | A | 1.0 | 4.0 | 2H |
| b | B | 0.7 | 3.3 | 3H |
| c | C | 0.9 | 3.1 | 2H |
| d | D | 1.3 | 4.2 | 2H |
| e | E | 1.1 | 4.4 | H |
| f | F | 1.0 | 2.5 | HB |
| g | G | 0.5 | 3.0 | H |
| h | H | 0.4 | 3.6 | HB |
| i | I | 0.7 | 3.8 | F |
| j | J | 1.2 | 2.6 | F |
| k | K | — | — | — |
| l | L | — | — | — |

The press formability of the lubrication treated steel sheets (a) to (l) shown in Table 6 is indicated in Table 7.

Table 7

| | Tendency to galling (Number of press formed sheets before galling occurs) | Press drawability (Limited drawing ratio = L.D.R.) | Peel-off of film at press work (at drawing ratio = 2.4) |
|---|---|---|---|
| a | 1500 | 2.34 | Peel off |
| b | 1750 | 2.33 | " |
| c | 1450 | 2.34 | " |
| d | 1400 | 2.39 | " |
| e | 1300 | 2.38 | " |
| f | 1200 | 2.35 | No peel off |
| g | 1250 | 2.34 | " |
| h | 1150 | 2.38 | " |
| i | 1050 | 2.40 | " |
| j | 1020 | 2.40 | " |
| k | 65 | 2.25 | — |
| l | 55 | 2.24 | — |

The test conditions used in the above galling and press drawing tests are shown in Table 8.

Table 8

| Item | Conditions |
|---|---|
| Tester used | Erichsen extrusion test machine |
| Diameter of blank | 100 to 120 mmφ |
| Diameter of punch | 50 mmφ |
| Punch curvature | 8R |
| Die curvature | 5R |
| Blank holder force | 500 Kg |
| Drawing rate | 200 mm/min |

As shown in Table 7, it is obvious that the solid lubricating film treated steel sheet a to j according to this invention are very superior in the anti-galling property and the press drawability to the solid lubricant (alkyl ester of fatty acid) treated steel sheet (k) or to the highly viscous mineral oil (press forming oil) treated steel sheet (l). The steel sheets (d), (e), (h), (i) and (j) which has a lubricant dispersed in the coating composition are particularly excellent in the press drawability. It has also been ascertained that the steel sheets (f), (g), (h), (i) and (j) with a coating composition composed essentially of the monomer and/or polymer containing one polymerizable double bond in one molecule and subjected to the curing treatment are particularly advantageous in that the film formed is not peeled off at the time of press work.

We claim:

1. A method for manufacturing a steel sheet having an anti-galling lubricative coating effective during severe press working thereof which comprises applying to a surface of a steel sheet a layer of a liquid coating composition whose main constituent is selected from the group of monomers and polymers that become solid when cured by irradiating with ionizing radiant energy in an oxygen-free environment but remain at least semi-liquid when the molecules thereof are contacted by oxygen while so irradiated, and subjecting said layer to irradiation with ionizing radiant energy while the exposed surface of said layer is in contact with an oxygen bearing atmosphere until a layer of said coating composition in contact with said sheet has become cured and solid while a surface layer of said composition on said cured layer has reacted with said oxygen and remains in said semi-liquid state.

2. A method according to claim 1 in which said coating composition contains a lubricant incompatible with the coating composition.

3. A method according to claim 1 in which the number of double bonds per each molecule of said coating composition is one.

4. A method according to claim 2 in which the number of double bonds per each molecule of said coating composition is one.

5. A method according to claim 1 in which said coating composition contains a polymerization initiator.

6. A method according to claim 2 in which said coating composition further contains a polymerization initiator.

* * * * *

UNITED STATES PATENT AND TRADEMARK OFFICE
CERTIFICATE OF CORRECTION

PATENT NO. : 4,091,123
DATED : May 23, 1978
INVENTOR(S) : Saburo Ayusawa; Takeo Nagashima; Masaya Tsutsumi It is certified that error appears in the above-identified patent and that said Letters Patent are hereby corrected as shown below:

At Col. 8, line 50, "5H, 3H," should read --5H, 4H, 3H,--.

At Col. 10, Table 4, under the heading "Coating Composition", the first formula should read as follows:--

Signed and Sealed this

Sixth Day of February 1979

[SEAL]

Attest:

RUTH C. MASON
Attesting Officer

DONALD W. BANNER
Commissioner of Patents and Trademarks